(No Model.) 2 Sheets—Sheet 1.
G. W. MERCER.
SLEIGH RUNNER.
No. 437,707. Patented Oct. 7, 1890.
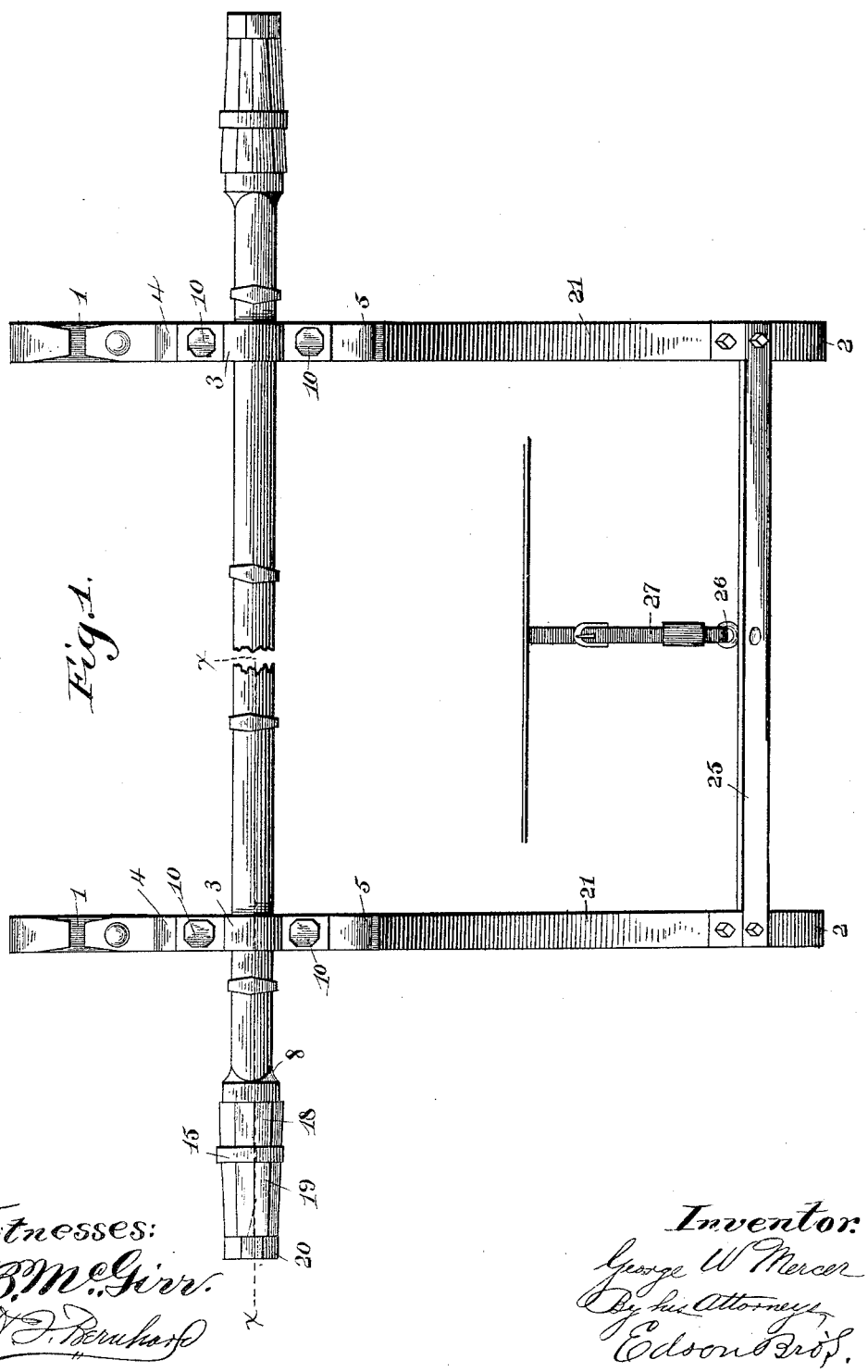

(No Model.) 2 Sheets—Sheet 2.
G. W. MERCER.
SLEIGH RUNNER.
No. 437,707. Patented Oct. 7, 1890.
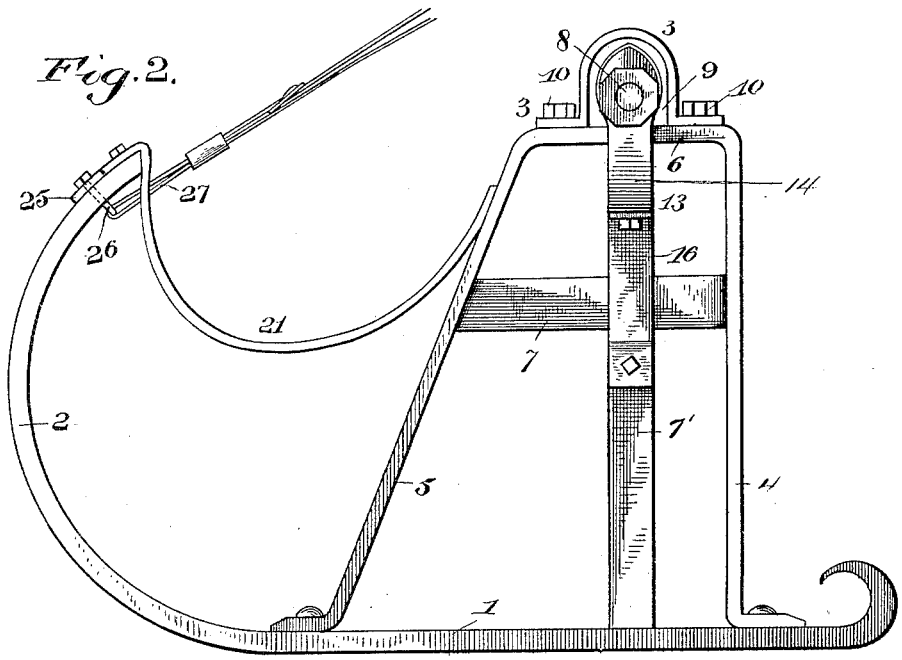
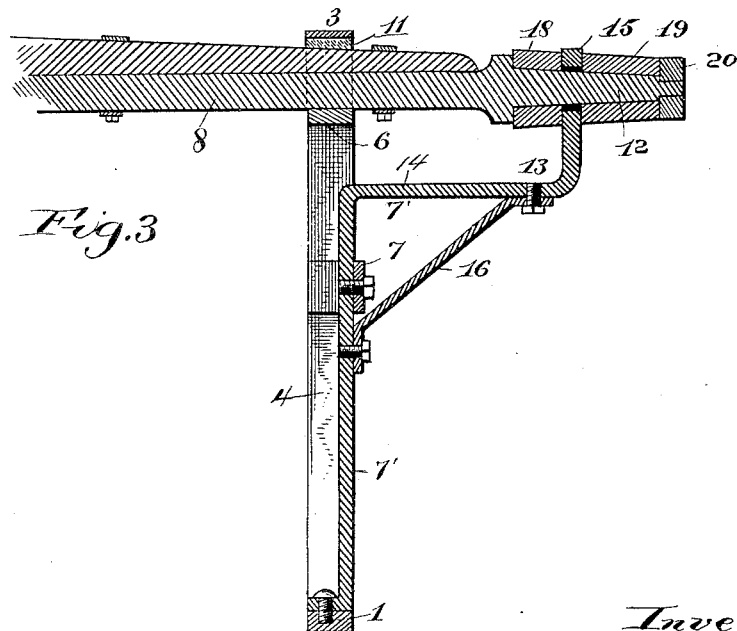
Witnesses:
Inventor.
George W. Mercer
By his Attorneys,
Edson Bros.

UNITED STATES PATENT OFFICE.

GEORGE W. MERCER, OF VIBBARD, MISSOURI.

SLEIGH-RUNNER.

SPECIFICATION forming part of Letters Patent No. 437,707, dated October 7, 1890.

Application filed January 21, 1890. Serial No. 337,593. (No model.)

*To all whom it may concern:*

Be it known that I, GEORGE W. MERCER, a citizen of the United States, residing at Vibbard, in the county of Ray and State of Missouri, have invented certain new and useful Improvements in Sleigh-Runners; and I do hereby declare the following to be a full, clear, and exact description of the invention, such as will enable others skilled in the art to which it appertains to make and use the same.

My invention relates to improvements in sleigh-runners; and it has for its object, first, to arrange and combine the parts so that the runners are adapted to follow in the track of the horses, instead of running in the unbroken snow, as is the case with all sleigh-runners known to me for use on buggies and other vehicles, whereby the vehicle is caused to run with greater ease and the draft on the animals is materially reduced; second, to provide a runner with means whereby the relative distance between the runner and axle-spindle can be varied, so that the distance between two adjacent runners is capable of regulation; third, to connect the axle to the runner in a peculiar manner, so that the axle can rock or oscillate on the support therefor to enable the runner to pass over stones and other obstructions without subjecting the vehicle-body to undue shock or jar, and, finally, to provide an improved runner that will run evenly or uniformly, is not liable to tilt, which can be made at a minimum cost, and is simple and durable in construction.

One of the leading features of my invention consists in the runners coupled or attached to the axle proper of a buggy, wagon, or similar vehicle and arranged within the spindles thereof, whereby the runners are caused to follow in the tracks made by the horses in the snow instead of traveling in the unbroken snow, which is advantageous because the vehicle runs much smoother and lighter and the draft on the animals is materially lessened.

My invention further consists of a runner adapted to be coupled to a vehicle-axle and an arm or brace secured to the runner and connected to the axle-spindle. This brace or arm is fitted loosely on the axle-spindle and held thereon by sleeves and the axle-nut, said sleeves being of different length, so that they can be adjusted to determine and vary the relative distance between the axle-spindle and the runner.

My invention further consists in a runner having a box or bearing for an axle, which is so shaped and proportioned that the axle can rock or oscillate a limited distance in said bearing, which permits the runner to turn in passing over stones or other obstructions and insure greater ease to the vehicle-body.

My invention further relates to the combination of devices, and in the construction and arrangement of several parts, as will be hereinafter fully set forth and claimed.

To enable others to more readily understand my invention, I will now proceed to a detailed description thereof in connection with the accompanying drawings, in which—

Figure 1 is a plan view of a pair of runners and a part of a vehicle. Fig. 2 is a side elevation of one of the runners. Fig. 3 is a sectional view on the line *x x* of Fig. 1.

Like numerals of reference denote corresponding parts in all the figures of the drawings, in which—

1 designates the runner proper, which is curved or bowed upward at the front end thereof, as at 2. On this runner in rear of the curved front end 2 thereof is secured an upright knee or support 3, which consists of the vertical rear leg 4, the inclined front leg 5, and the horizontal part 6, all being made or bent from a single continuous piece or bar of metal. The knee or support is preferably secured to the runner by means of bolts or rivets, which pass through perforated feet on the legs of said support or knee, and the legs of the knee are braced at points intermediate of the length thereof by a horizontal arm 7, which is united or secured at its ends to the legs.

On the horizontal arm 6 of the upright support or knee 3 is secured a box or bearing 9, which receives the axle 8 of a buggy, wagon, or other vehicle to which it is desired to apply the runners. This bearing 9 is preferably bent from a single piece of flat metal, and its extremities flanged and perforated to permit tap-bolts 10 to pass through the bearing and into the support or knee to secure the bearing detachably to said knee. This bearing is so shaped and proportioned that it corresponds approximately to the contour and size in cross-section of the axle, which is fitted loosely within the bearing, so that the axle can rock or oscillate in the bearing for a limited distance. The inner surface of the bearing is lined with a packing 11, which comes in contact with the wooden part of the axle, and thus obviates undue wear on the axle; but this lining is not important and may be used or omitted at pleasure.

The knee or support of the runner is coupled by the bearing 9 to the axle at a point a short distance within the axle-spindle 12, and the knee is braced by an elbow-shaped standard 13, the vertical part of which is arranged between the front and rear legs of the knee, and it is united to the runner and to the horizontal brace of the knee by bolts or in any other suitable manner. The elbow 14 of this standard projects laterally from the knee, and in the upper extremity of the elbow is formed an eye 15, which receives the axle-spindle 12, the elbow itself being braced by an inclined strut 16, which is secured to the vertical standard and horizontal elbow-arm, as clearly shown in Fig. 3, the elbow-standard being arranged in the vertical plane of the axle and the spindle thereof.

The elbow of the standard is held from movement on the axle-spindle, as well as accidental disengagement with the spindle, by means of two sleeves 18 19 and the axle-nut 20. These sleeves 18 19 are applied to the axle-spindle on opposite sides of the elbow, the one bearing against the elbow and the collar formed on the axle between the terminal thereof and the axle-spindle, and the other sleeve bearing against the opposite side of the elbow and the axle-nut. These two sleeves are of different lengths, preferably of uniform diameter, or substantially so, to make them interchangeable, and if it is desired to arrange the runner near to the axle-spindle and farther away from the adjacent runner on the same axle, the shorter sleeve of the two sleeves is placed between the axle-collar and the elbow; but if it is desired to arrange the runner farther away from the axle-spindle and nearer to the adjacent runner on the same axle, the longer sleeve is placed between the axle-collar and the elbow. The distance between the two runners on the same axle can thus be readily and quickly varied, and each runner can be easily applied to or removed from the axle and its spindle, as it is only necessary to couple the runner to the axle by the bearing and by the sleeves and the axle-nut, these parts being easily adjusted and secured.

The inclined front leg 5 of the upright support or knee projects well forward beyond the axle and in itself serves as a brace, and the curved end of the runner 1 and the front leg of the knee or upright are braced by a curved bar 21, which is united at its ends to the upper extremity of the runner and to the front inclined leg of the knee in any suitable manner.

To the upper curved ends of the runners 1 1 on the front axle of a vehicle is secured by bolts the ends of a coupling-bar 25, which has a central loop 26, and through this loop passes a strap 27, that couples with the front bar or spring of the vehicle-body, whereby the coupling-rod and strap are caused to take up the strain on the parts when one runner strikes an obstruction and operate to prevent springing of the axle, &c.

The operation and advantages of my invention will be readily understood and appreciated by those skilled in the art from the foregoing description, taken in connection with the drawings.

I am aware that changes in the form and proportion of parts and details of construction can be made without departing from the spirit of my invention, and I would therefore have it understood that I hold myself at liberty to make such modifications of the mechanisms herein shown and described as embodiments of my invention.

Having thus fully described my invention, what I claim as new, and desire to secure by Letters Patent, is—

1. The combination, with an axle and a runner, of a knee rigidly secured to the runner and coupled to the axle within the spindle thereof and having a transverse brace intermediate of its front and rear parts, and a vertical standard 7', secured to the runner and the transverse brace of the knee, said standard being arranged in the vertical plane of the axle and having the laterally-extending arm 14, which is fitted on the spindle of the axle, substantially as and for the purpose described.

2. The combination, with an axle and a runner, of a knee rigidly secured to the runner and coupled to the axle and provided with a rigid transverse brace between the front and rear legs of the same, a vertical standard rigidly secured to the runner and the brace of the knee in the vertical plane of the axle and having the laterally-extending bent arm, which is fitted on the spindle of the axle, and a diagonal rigid brace between the vertical part and horizontal arm of said standard, as and for the purpose described.

3. The combination of an axle-spindle, the runner, the vertical knee or support rigidly secured to the runner and having a bearing for the axle, a vertical standard 7', secured to the runner and knee and having an elbow 14, which extends laterally beyond the standard and fitted on the axle-spindle, and thimbles 18 19, fitted loosely on the axle-spindle and situated on opposite sides of the elbow between the latter and the collar and nut on the axle-spindle, substantially as and for the purpose described.

4. The combination of an axle having a spindle, the runner, the vertical knee or support rigidly secured to the runner and having a bearing for the axle, a vertical standard 7', secured to the runner and knee and having an elbow 14, which extends laterally beyond the standard and is fitted on the axle-spindle at a point intermediate between the collar and nut on said spindle, and the thimbles 18 19, fitted loosely on the axle-spindle and arranged between the elbow and the collar and nut on the spindle, said sleeves being of different lengths and removable from the spindle, for the purpose described, substantially as set forth.

5. A sleigh-runner having the forward end thereof curved upwardly at 2, a vertical knee rigidly secured to the runner and consisting of the connected vertical and inclined legs 4 5, a brace 21, secured to the upper end 2 of the runner and the front leg of the knee, a bearing secured to the knee, an axle fitted in said bearing and having a spindle, and a vertical standard 7', secured to the runner and knee and having an elbow connected to the axle-spindle, substantially as described.

In testimony whereof I affix my signature in presence of two witnesses.

GEO. W. MERCER.

Witnesses:
J. K. JOINER,
J. R. HOLMAN.